(12) United States Patent
Riihinen et al.

(10) Patent No.: US 6,944,462 B2
(45) Date of Patent: Sep. 13, 2005

(54) CONTROL NODE HANDOVER IN RADIO ACCESS NETWORK

(75) Inventors: Wesa Riihinen, Lulea (SE); Johan Söderberg, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 747 days.

(21) Appl. No.: 09/732,877

(22) Filed: Dec. 11, 2000

(65) Prior Publication Data

US 2002/0072363 A1 Jun. 13, 2002

(51) Int. Cl.[7] .................................................. H04Q 7/20
(52) U.S. Cl. ....................... 455/453; 370/229; 370/329; 709/235
(58) Field of Search ............................ 455/453, 432.1, 455/436, 438, 442, 560, 433, 450, 8, 406, 408; 370/229–236, 237, 238, 332, 328, 329, 331; 709/235

(56) References Cited

U.S. PATENT DOCUMENTS

| | | | |
|---|---|---|---|
| 5,487,065 A | | 1/1996 | Acampora et al. |
| 5,590,126 A | | 12/1996 | Mishra et al. |
| 5,646,978 A | | 7/1997 | Klem et al. |
| 5,872,773 A | * | 2/1999 | Katzela et al. ............. 370/256 |
| 5,875,185 A | | 2/1999 | Wang et al. |
| 5,940,762 A | | 8/1999 | Lee et al. |
| 6,212,380 B1 | * | 4/2001 | Laatu ......................... 455/436 |
| 6,370,127 B1 | * | 4/2002 | Daraiseh et al. ............ 370/328 |
| 6,631,125 B1 | * | 10/2003 | Longoni et al. ............ 370/341 |
| 6,650,905 B1 | * | 11/2003 | Toskala et al. ............. 455/522 |

FOREIGN PATENT DOCUMENTS

| | | |
|---|---|---|
| EP | 0 898 438 A2 | 2/1999 |
| GB | 0898 438 A2 * | 8/1998 |
| WO | 99/51051 A2 | 10/1999 |

* cited by examiner

*Primary Examiner*—Marsha D. Banks-Harold
*Assistant Examiner*—Nghi H. Ly
(74) *Attorney, Agent, or Firm*—Nixon & Vanderhye, P.C.

(57) ABSTRACT

A telecommunications system (10) has a radio access network comprising plural control nodes (26) and inter-control node links (Iur) for connecting the plural control nodes. A handover selection function (200) makes a selection regarding which of plural connections handled by the radio access network should have control thereof moved from a first control node (e.g., current SRNC) to another of the plural control nodes (e.g., target SRNC) to alleviate congestion on an overloaded one of the inter-control node links. The selection includes a determination of a cost for each of the connections carried by the overloaded link. The cost of each of the connections carried by the overloaded link is a product of a number of inter-control links involved in the connection and an inter-control link bandwidth required by the connection. The handover selection function particularly determines a most costly one of the connections carried by the overloaded link, and further determines a target one of the plural control nodes to which the control of the most costly connection can be handed over. In accordance with one aspect of the invention, the target control node is a control node involved in the candidate connection which is farthest from the first control node (e.g., current SRNC node).

19 Claims, 15 Drawing Sheets

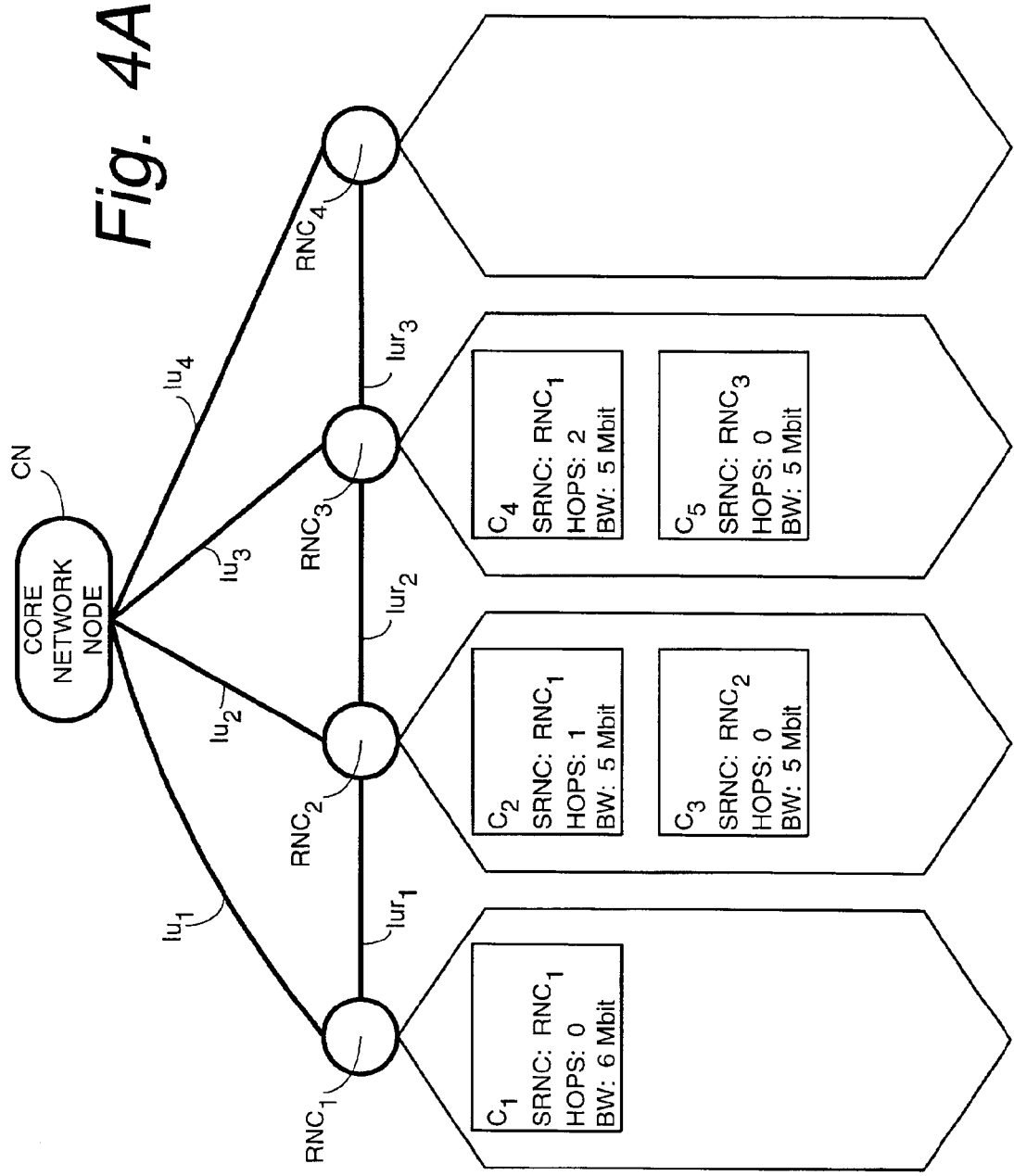

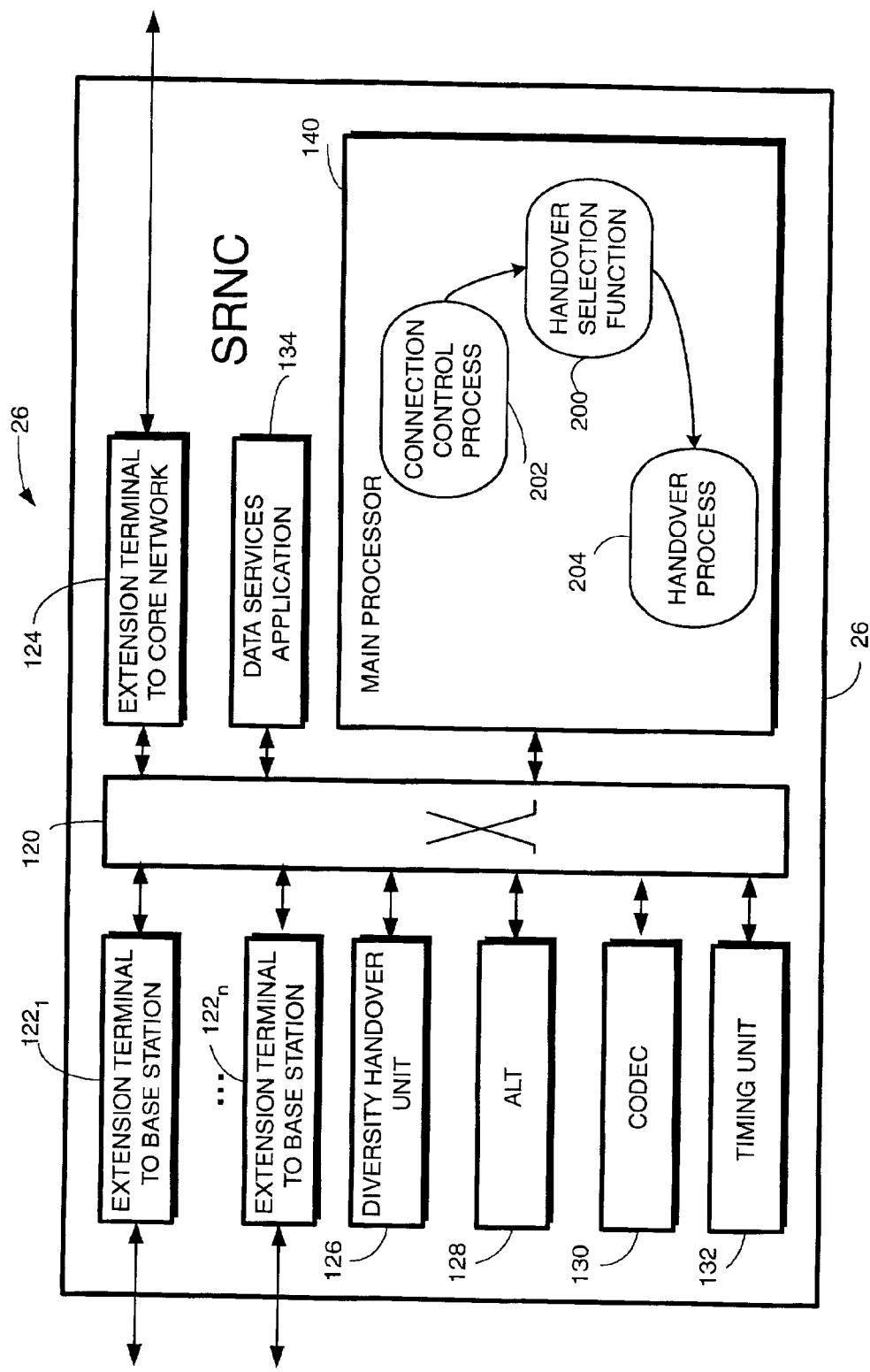

CONTROL NODE HANDOVER IN RADIO ACCESS NETWORK

This application is related to simultaneously-flied U.S. patent application Ser. No. 09/732,883, entitled "Balancing Loads on Telecommunications Links", which is incorporated herein by reference in its entirety.

BACKGROUND

1. Field of the Invention

The present invention pertains to radio access telecommunications networks having control nodes, and particular to the handover of a control of a connection from one control node to another control node of the radio access network.

2. Related Art and Other Considerations

In a typical cellular radio system, mobile user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller (RNC). The radio network controller, also sometimes termed a base station controller (BSC), supervises and coordinates various activities of the plural base stations connected thereto. The radio network controllers are typically connected to one or more core networks.

One example of a radio access network is the Universal Mobile Telecommunications (UMTS) Terrestrial Radio Access Network (UTRAN). The UTRAN is a third generation system which in some respects builds upon the radio access technology known as Global System for Mobile communications (GSM) developed in Europe. UTRAN is essentially a wideband code division multiple access (W-CDMA) system.

As those skilled in the art appreciate, in W-CDMA technology a common frequency band allows simultaneous communication between a user equipment unit (UE) and plural base stations. Signals occupying the common frequency band are discriminated at the receiving station through spread spectrum CDMA waveform properties based on the use of a high speed, pseudo-noise (PN) code. These high speed PN codes are used to modulate signals transmitted from the base stations and the user equipment units (UEs). Transmitter stations using different PN codes (or a PN code offset in time) produce signals that can be separately demodulated at a receiving station. In a phenomena know as diversity, the high speed PN modulation also allows the receiving station to advantageously generate a received signal from a single transmitting station by combining several distinct propagation paths or "legs" of the transmitted signal. In CDMA, therefore, a user equipment unit (UE) need not switch frequency when handoff of a connection is made from one cell to another. As a result, a destination cell can support a connection to a user equipment unit (UE) at the same time the origination cell continues to service the connection. Since the user equipment unit (UE) is always communicating through at least one cell during handover, there is no disruption to the call. Hence, the term "soft handover." In contrast to hard handover, soft handover is a "make-before-break" switching operation.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Iu interface". An interface between radio network controllers (e.g., between a Serving RNC [SRNC] and a Drift RNC [DRNC]) is termed the "Iur" interface.

Thus, a network such as a W-CDMA system has numerous nodes which are interconnected, for example numerous radio network controller (RNC) nodes which are connected by inter-RNC links. Typically, one radio network controller node (RNC), denominated as the serving RNC or SRNC, is assigned to control a connection. In this regard, the serving RNC or SRNC is responsible for handling the quality of the connection (e.g., termination point of the layer 2 transmission protocols such as the RLC protocol, serves as a decision-taker when the mobile should change data rate; and various administrative functions (such as logging how much the user should be charged for a particular connection, etc.). The connection is between a first party, which is a mobile party (e.g., mobile station or user equipment unit), and another party (which may either be a mobile party or a fixed party [e.g., in the PLMN]). The connection can have plural legs involving different base stations in view of the diversity capabilities mentioned above. Moreover, as explained below, the connection (with its possibly plural legs) may be routed to its SRNC over one or more inter-RNC links and through several radio network controller nodes, some of which may function as drift RNCs (DRNCs).

When a new connection is requested in a network, the system typically tries to set up the connection through the shortest path, thus making the closest network node an anchor (e.g., serving RNC or SRNC) for the connection. But as the user equipment unit (UE) involved in the connection travels geographically, one or more legs of the connection may be established through different (e.g., newly utilized) base stations to provide the diversity capability mentioned above.

If the user equipment unit (UE) travels sufficiently far, the new cell into which it ventures may be covered by a new base station for the connection. That new base station may, in turn, be controlled by another radio network controller node (i.e., a RNC which is not the SRNC for the connection). In such situation, the newly involved RNC becomes a drift RNC (DRNC) for the leg of the connection extending into the new cell. In such case, and as used herein, the term "connection" can refer to and encompass one or more of the legs of the connection in the radio access network. The serving RNC (SRNC) still controls the connection using signaling transmitted over one or more inter-RNC link(s) (e.g., over the Iur interface) which connect the SRNC and the DRNC. For example, connection combining and connection splitting operations are performed at the SRNC for the connection (see, U.S. patent application Ser. No. 09/979,866 filed Nov. 26, 1997, entitled "Multistage Diversity Handling For CDMA Telecommunications", which is incorporated herein by reference in its entirety).

After a first DRNC is established with respect to connection involving a user equipment unit (UE), the user equipment unit (UE) may travel even further into a cell controlled by yet another RNC. As a leg for the connection with the user equipment unit (UE) is established in this further cell, this another RNC then will become a second DRNC for the connection. In such case, the second DRNC is two "hops" away from the SRNC. In other words, the second DRNC is connected by two inter-RNC links to the SNRC. Further travel of the user equipment unit (UE) may invoke yet further DRNCs in an almost telescoping manner.

If the user equipment unit (UE) travels sufficiently far, e.g., so far that a preponderance of the legs of the connection are routed to the SRNC through one or more DRNCs, consideration can be given whether the role of the SRNC should be moved over or relocated to one of the DRNCs. In such consideration, a determination is made whether the original SRNC should hand over control of the connection to a qualifying one of the DRNCs involved in the connection, e.g., a target SRNC. Such moveover is discussed, e.g., in U.S. patent application Ser. No. 09/980,013 filed Nov. 26, 1997, entitled "Diversity Handling Moveover For CDMA Telecommunications", which is incorporated herein by reference in its entirety. See, also, U.S. patent application Ser. No. 09/035,788 filed Mar. 6, 1998, entitled "Telecommunications Inter-Exchange Congestion Control", and U.S. patent application Ser. No. 09/035,821 filed Mar. 6, 1998, entitled "Telecommunications Inter-Exchange Measurement Transfer", both of which are incorporated herein by reference in their entirety.

A system such as a W-CDMA system supports a wide range of users and services. The characteristics of the system can produce very heavily loaded networks. In order to utilize the networks optimally, it is of paramount importance to reduce unnecessary load in and between the control nodes (e.g., RNCs) of the network.

Utilization of a Serving RNC (SRNC) involves at least two different potential (and possibly competing) load considerations. A first load consideration is that, as the user equipment unit (UE) travels farther from the SRNC to involve an increasing number of DRNCs, there is an exponential increase in both (1) the information stored at the SRNC regarding the connection, and (2) the load over time on the Iur links (e.g., the inter-RNC links) connecting the SRNC with the DRNCs. Consequentially, to avoid overload on the Iur links, inter-RNC handover should be performed as the user equipment unit (UE) moves farther from the SRNC. However, as a second load consideration, when the responsibility for the user connection is handed over to another RNC, e.g., a target SRNC, a certain amount of signaling between and processing in the involved network nodes (e.g., the original SRNC and the target SRNC) occurs.

Some strategies for controlling inter-RNC handover have been proposed. One strategy is to presume that a constant number of RNC hops should justify the inter-RNC handover. But this strategy can lead to unnecessary handovers since a handover might be performed even if the Iur links are very lightly loaded. On the other hand, strategies that never perform inter-RNC handover will, most likely, eventually overload at least some of the Iur links What is needed, therefore, and an object of the present invention, is a technique which judiciously controls inter-control node handovers of a radio access network by invoking various load considerations.

BRIEF SUMMARY OF THE INVENTION

A telecommunications system has a radio access network comprising plural control nodes and inter-control node links for connecting the plural control nodes. A handover selection function makes a selection regarding which connection (of plural connections handled by the radio access network) should have control thereof moved from a first control node (e.g., current SRNC) to another of the plural control nodes (e.g., target SRNC) to alleviate congestion on an overloaded one of the inter-control node links.

The selection includes a determination of a cost for each of the connections carried by the overloaded link. The cost of each of the connections carried by the overloaded link is a product of a number of inter-control links involved in the connection and an inter-control link bandwidth required by the connection. The handover selection function particularly determines a most costly one of the connections carried by the overloaded link, and further determines a target one of the plural control nodes to which the control of the most costly connection can be handed over. In accordance with one aspect of the invention, the target control node is a control node involved in the candidate connection which is farthest from the first control node (e.g., current SRNC node).

In a preferred first mode of the invention, the handover selection function can be located at a core network control node, but in a second mode can also be located at a control node of the radio access network.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 4A–FIG. 4E are schematic views depicting portions of the example mobile communications system and illustrating a time sequenced execution of aspects of the handover selection function of the present invention generic both to the first and second modes.

FIG. 6B is a schematic view of an example RNC node configured for the first mode of the invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
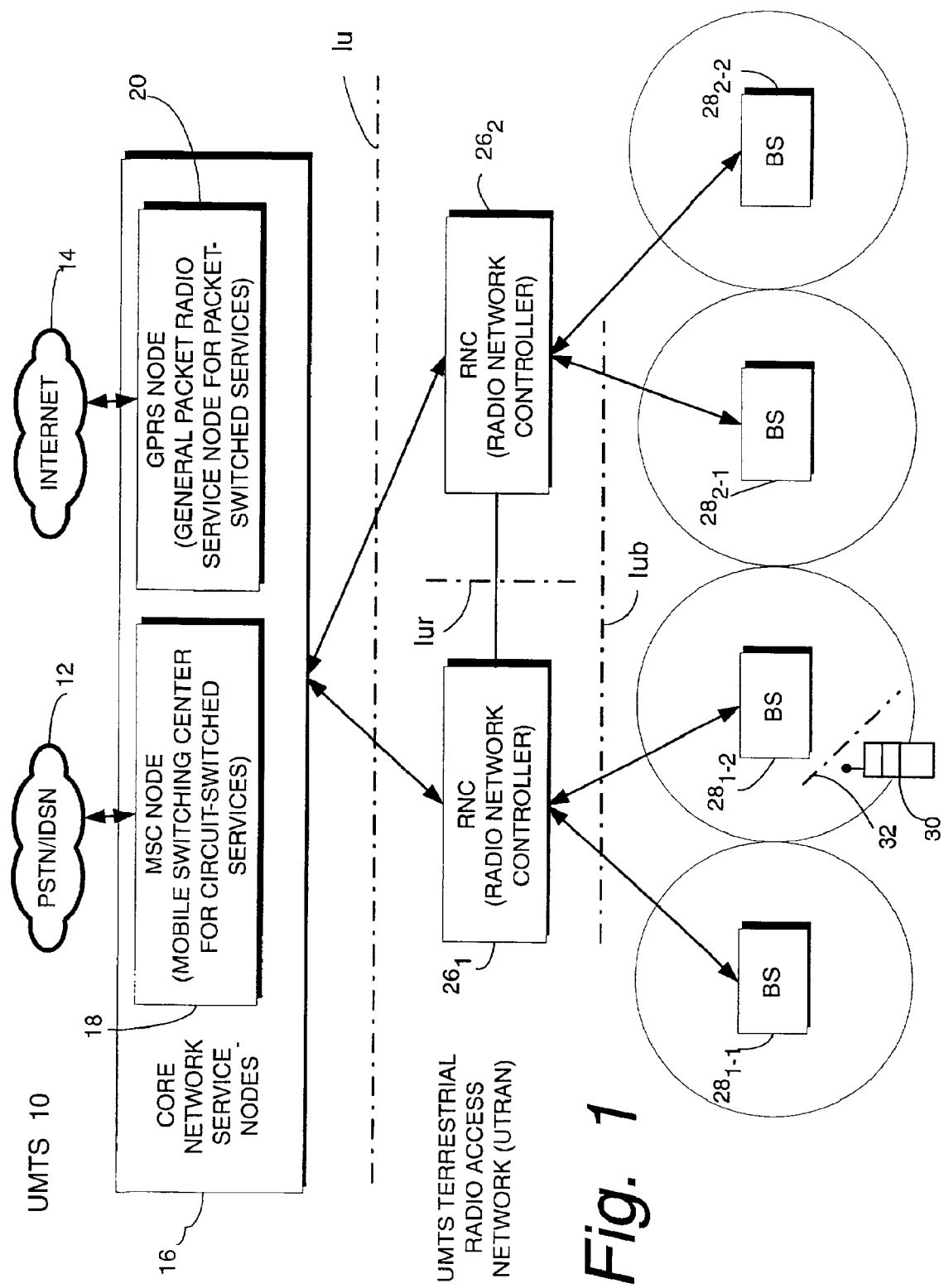
FIG. 1 is schematic view of non-limiting, example and representative mobile communications system in which the present invention may be advantageously employed.

The present invention is described in the non-limiting, example context of a universal mobile telecommunications (UMTS) 10 shown in FIG. 1. A representative, connection-oriented, external core network, shown as a cloud 12 may be for example the Public Switched Telephone Network (PSTN) and/or the Integrated Services Digital Network (ISDN). A representative, connectionless-oriented external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected to a General Packet Radio Service (GPRS) node 20 tailored to provide packet-switched type services which is sometimes referred to as the serving GPRS service node (SGSN).

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26. For sake of simplicity, the UTRAN 24 of FIG. 1 is shown with only two RNC nodes, particularly RNC $26_1$ and RNC$26_2$. Each RNC 26 is connected to a plurality of base stations (BS) 28. For example, and again for sake of simplicity, two base station nodes are shown connected to each RNC 26. In this regard, RNC $26_1$ serves base station $28_{1-1}$ and base station $28_{1-2}$, while RNC 262 serves base station $28_{2-1}$ and base station $28_{2-2}$. It will be appreciated that a different number of base stations can be served by each RNC, and that RNCs need not serve the same number of base stations. Moreover, FIG. 1 shows that each RNCs is connected to one or more other RNCs over an Iur interface, e.g., RNC $26_1$ and RNC $26_2$ connected to one another over the Iur interface in the URAN 24.

A user equipment unit (UE), such as user equipment unit (UE) 30 shown in FIG. 1, communicates with one or more base stations (BS) 28 over a radio or air interface 32.

Each of the radio interface 32, the Iu interface, the Iub interface, and the Iur interface are shown by dash-dotted lines in FIG. 1.

Preferably, radio access is based upon wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality. Each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Different types of control channels may exist between one of the base stations 28 and user equipment units (UEs) 30. For example, in the forward or downlink direction, there are several types of broadcast channels including a general broadcast channel (BCH), a paging channel (PCH), a common pilot channel (CPICH), and a forward access channel (FACH) for providing various other types of control messages to user equipment units (UEs). In the reverse or uplink direction, a random access channel (RACH) is employed by user equipment units (UEs) whenever access is desired to perform location registration, call origination, page response, and other types of access operations. The random access channel (RACH) is also used for carrying certain user data, e.g., best effort packet data for, e.g., web browser applications.

As set up by the control channels, traffic channels (TCH) are allocated to carry substantive call communications with a user equipment unit (UE). Some of the traffic channels can be common traffic channels, while others of the traffic channels can be dedicated traffic channels (DCHs).

Figure 2:
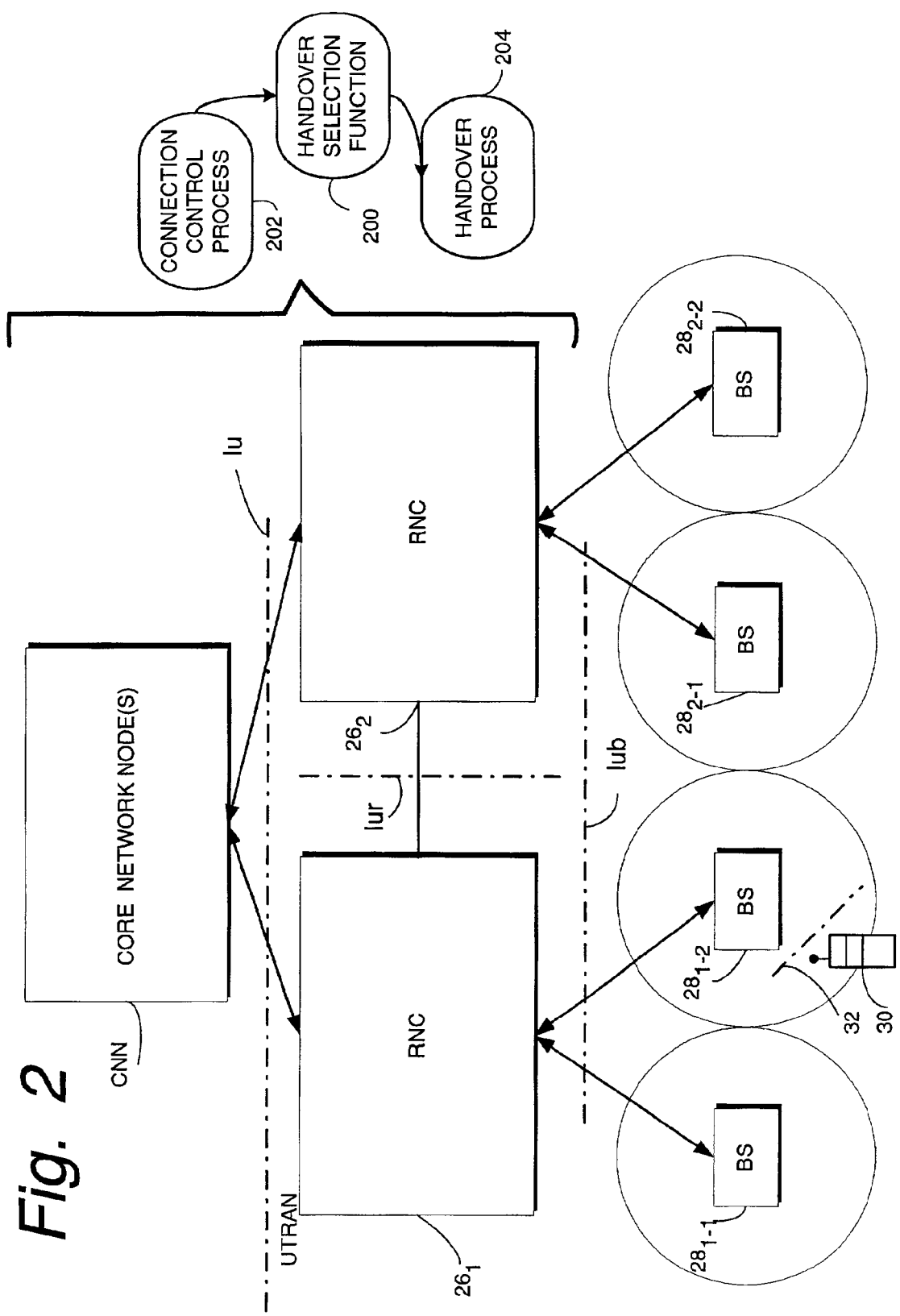
FIG. 2 is a partially schematic, partially diagrammatic view showing generically, in the context of the system of FIG. 1, performance of various handover-related processes and functions performed by either radio access network control nodes or by radio access network control nodes in conjunction with core network node(s).

The present invention particularly involves a handover selection function 200 which is depicted in FIG. 2 as cooperating with a connection control process 202 and a handover process 204. When connection control process 202 indicates that a new connection would result in an overload on an inter-control node link (e.g, Iur link) connecting radio network control nodes, in accordance with the present invention the handover selection function 200 makes a selection regarding which of plural connections handled by the radio access network should have control thereof moved from a first control node (e.g., current SRNC) to another of the plural control nodes (e.g., target SRNC) to alleviate congestion on an overloaded one of the inter-control node links. The selection includes a determination of a cost for each of the connections carried by the overloaded link. The cost of each of the connections carried by the overloaded link is a product of a number of inter-control links involved in the connection and an inter-control link bandwidth required by the connection. The handover selection function particularly determines a most costly one of the connections carried by the overloaded link, and further determines a target one of the plural control nodes to which the control of the most costly connection can be handed over.

Figure 2A:
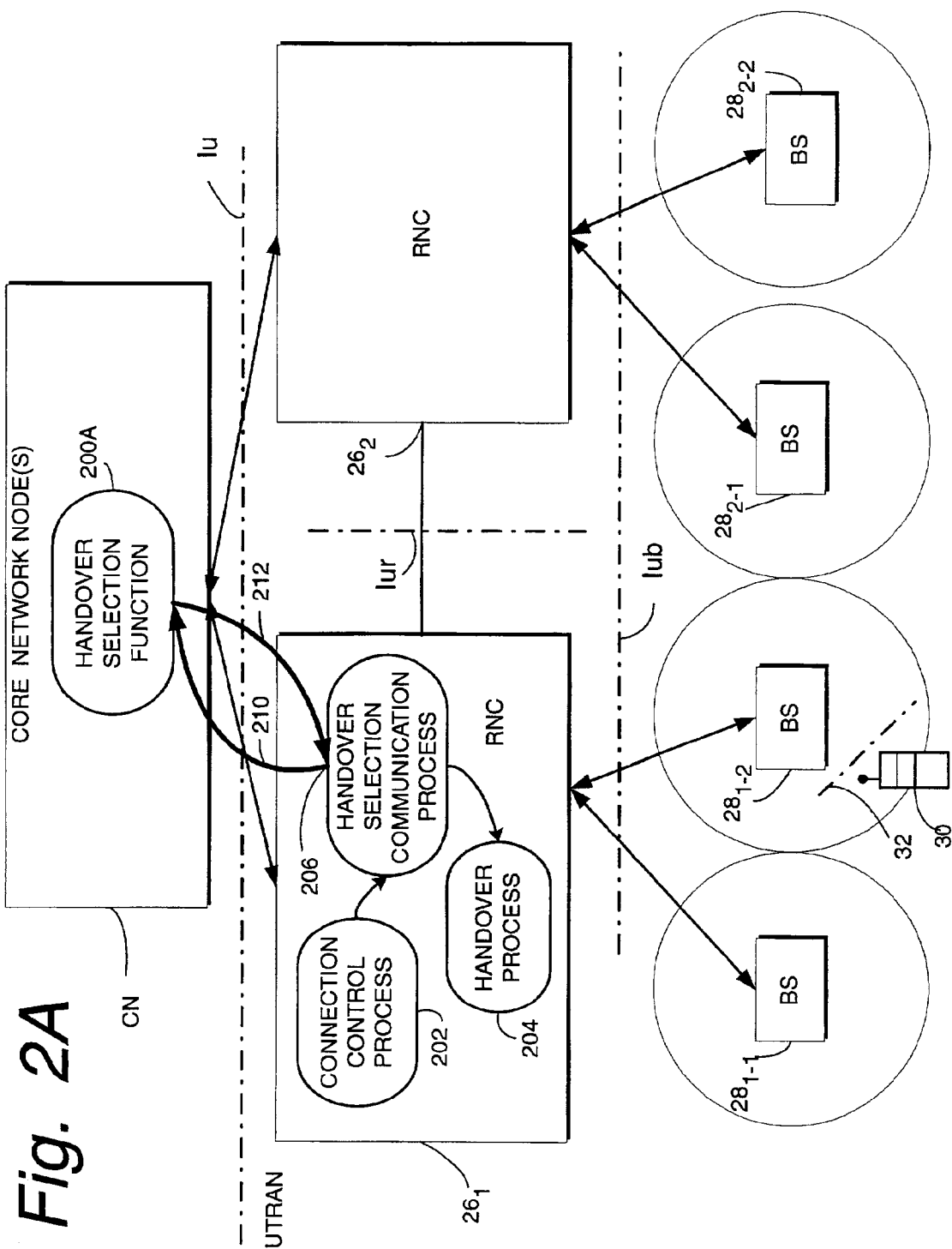
FIG. 2A is a partially schematic, partially diagrammatic view showing, in the context of the system of FIG. 1, a first mode of the invention wherein the various handover-related processes and functions are performed by radio access network control nodes in conjunction with core network node(s).
Figure 2B:
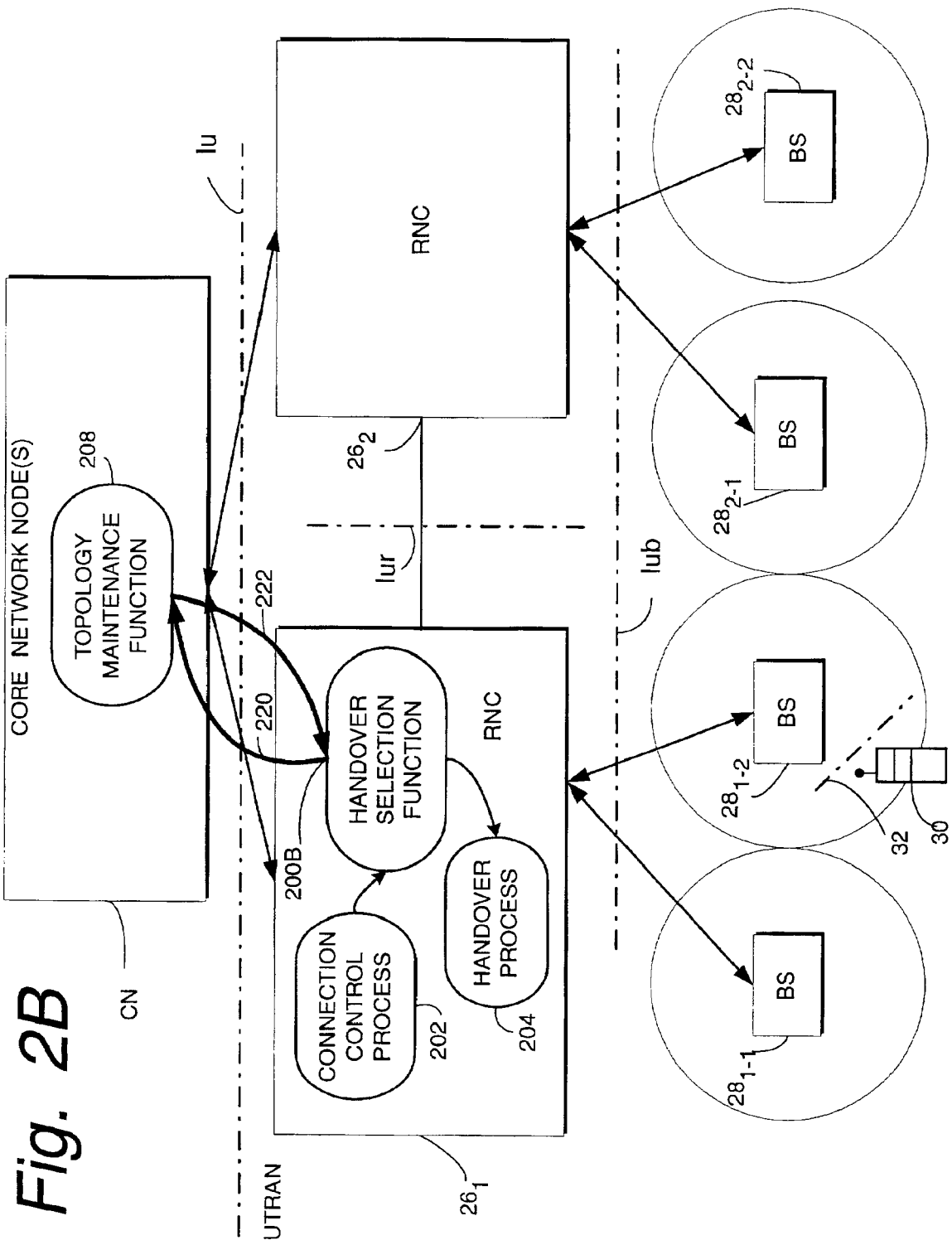
FIG. 2B is a partially schematic, partially diagrammatic view showing, in the context of the system of FIG. 1, a second mode of the invention wherein the various handover-related processes and functions are performed primarily by radio access network control nodes which obtain network topology information from core network node(s).

FIG. 2 generically represents that the handover selection function 200, connection control process 202, and handover process 204 can be distributed over a combination of radio access network control nodes and core network nodes (CCN), or performed primarily by radio access network control nodes [which obtain network topology information from core network node(s) CNN]. As explained above with reference to FIG. 1, the core network node CCN can be a mobile switching center (MSC) or a SGSN node (Serving GPRS Support Node) directly connected to several radio network control (RNC) nodes, and having authority to decide over what paths data shall be routed towards the user equipment unit (UE) 30. FIG. 2A and FIG. 2B respectively depict first and second example modes of the invention for implementing the generic scheme of FIG. 2.

In the first mode represented in FIG. 2A, the connection control process 202 and the handover process 204 are preformed at a radio access network control node, but the first mode version of the handover selection function 200A is performed at a core network node (CN). The first mode of FIG. 2A further involves radio access network control node performing a handover selection communication process 206 when the connection control process 202 determines that the handover selection function 200A should be performed by the core network node CNN. Basically the handover selection communication process 206 sends a handover selection request message 210 to the handover selection function 200A of the core network node CNN. The handover selection function 200A performs basic steps such as those hereinafter described with reference to FIG. 3A. After the handover selection function 200A has completed its execution, the handover selection function 200A returns its directives regarding the handover in a handover selection response message 212.

In the second mode represented in FIG. 2B, the second mode version of the handover selection function 200B along with the connection control process 202 and the handover process 204 are preformed at a radio access network control node. However, in order to gain certain network topology-related information, the handover selection function 200B must consult a topology maintenance function 208 located at the core network control node (CN). FIG. 2B shows handover selection function 200B sending a network topology request message 220 to topology maintenance function 208, and in response receiving a network topology request message 222. The handover selection function 200 uses the information provided in the network topology request message 222 in the manner hereinafter described with reference to FIG. 3B.

Figure 3A:
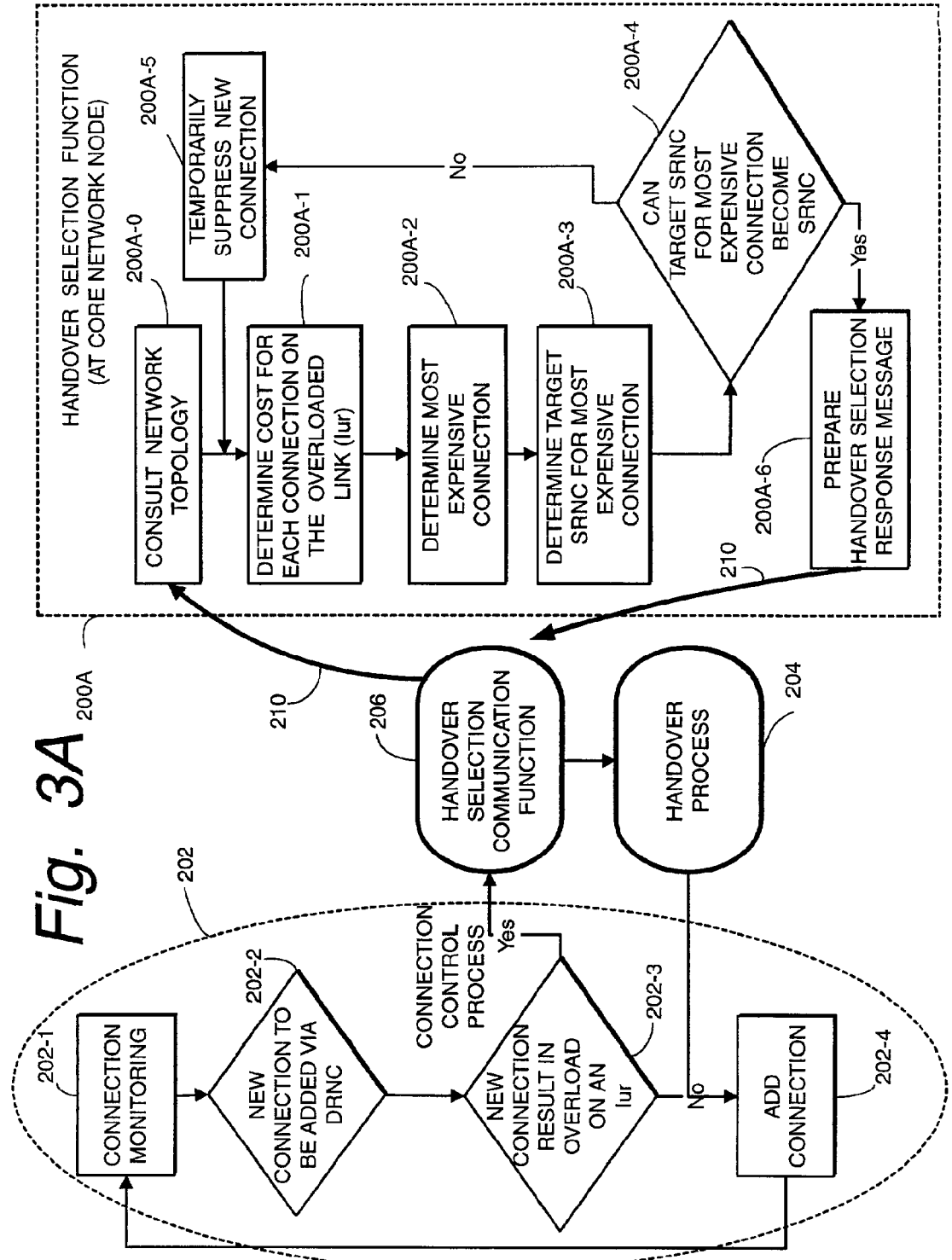
FIG. 3A is a flowchart which shows, e.g., example basic steps included in a handover selection function in accordance with the first mode of the present invention.
Figure 3B:
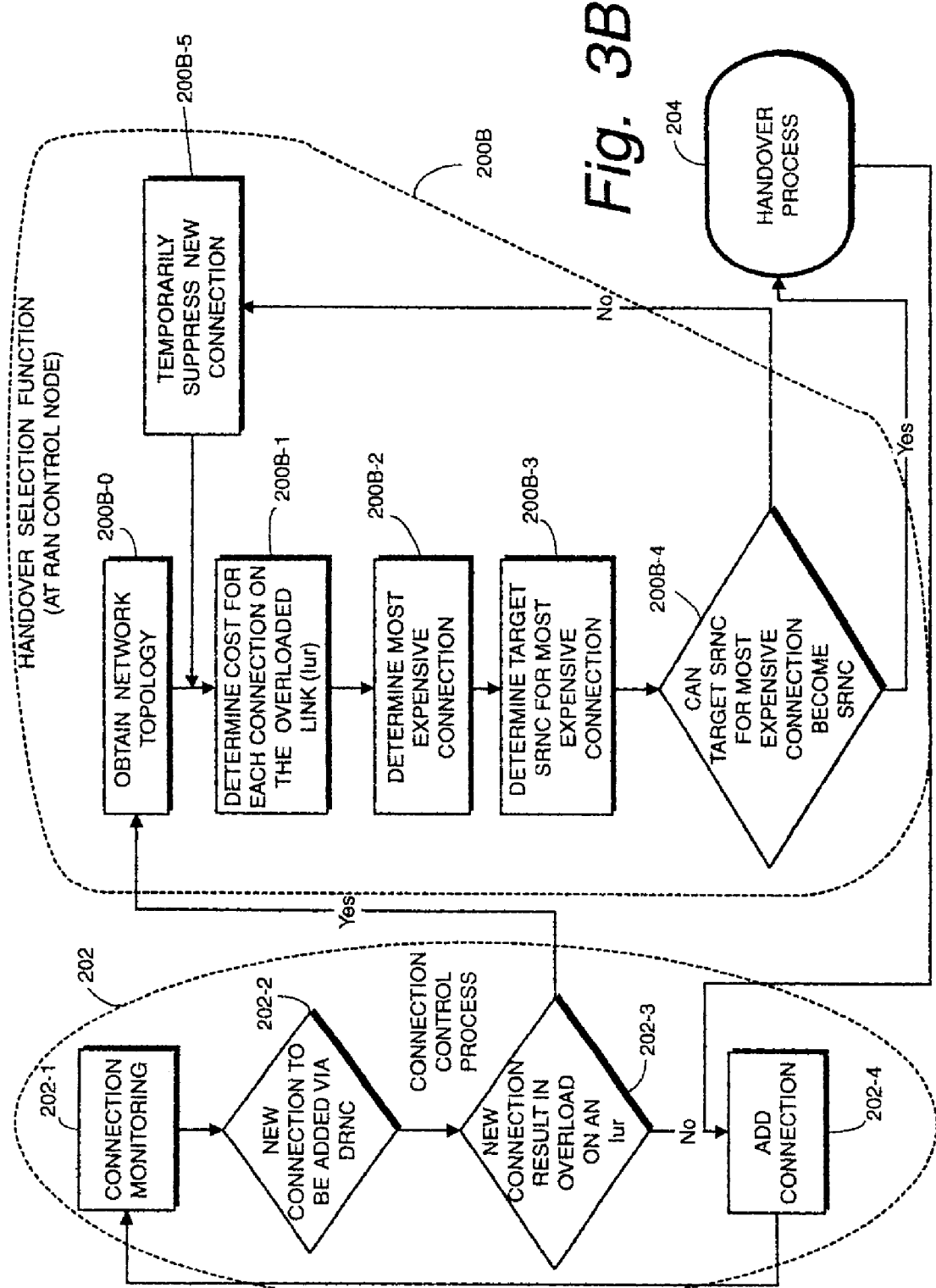
FIG. 3B is a flowchart which shows, e.g., example basic steps included in a handover selection function in accordance with the second mode of the present invention.
Figure 4B:
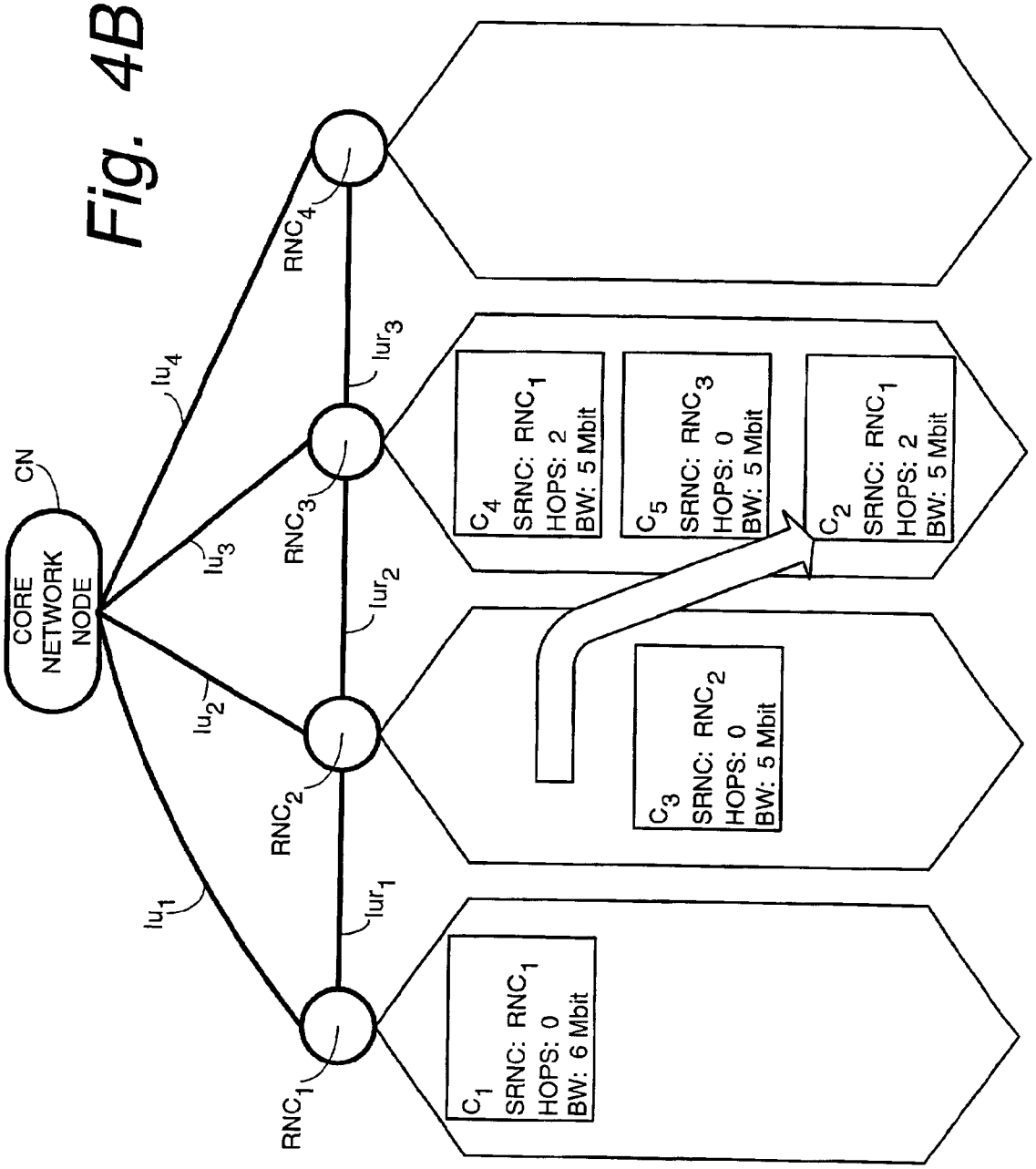

Turning first to the first mode generally illustrated in FIG. 2A, basic steps included in handover selection function 200 are depicted in the flowchart of FIG. 3A. These basic steps, as well as basic steps of the second mode as hereinafter described with reference to FIG. 3B, are discussed in the context of the representative radio access network scenario depicted in FIG. 4A–FIG. 4E. FIG. 4A shows an example, non-limiting configuration of certain aspects of a radio access network, such as the UTRAN type of radio access network of FIG. 1. FIG. 4A particularly shows four radio network controller (RNC) nodes, specifically $RNC_1$, $RNC_2$, $RNC_3$, and $RNC_4$. Each of the four radio network controller (RNC) nodes $RNC_1$, $RNC_2$, $RNC_3$, and $RNC_4$ can take the form of RNC nodes 26 described with reference to FIG. 1–FIG. 6, for example. Each radio network controller RNC is connected to a core network node CN by an Iu interface link. Specifically, $RNC_1$ is connected to the core network node CN by link $Iu_1$; $RNC_2$ is connected to the core network node CN by link $Iu_2$; $RNC_3$ is connected to the core network node CN by link $Iu_3$; and, $RNC_4$ is connected to the core network node CN by link $Iu_4$. The core network node CN can be a node such as the mobile switching center (MSC) node 18 or the Serving GPRS (SGSN) node 20 of FIG. 1, for example.

Each radio network controller RNC is connected to one or more adjacent radio network controllers via a bidirectional Iur interface link. Specifically, radio network controller $RNC_1$ is connected to radio network controller $RNC_2$ by link $Iur_1$; radio network controller $RNC_2$ is connected to radio network controller $RNC_3$ by link $Iur_2$; 5 and, radio network controller $RNC_3$ is connected to radio network controller $RNC_4$ by link $Iur_3$. It is overload or congestion on the links $Iur_1$, $Iur_2$, and $Iur_3$ that is addressed and solved by the handover selection function 200 (both handover selection functions 200A and 200B) of the present invention.

FIG. 4A further shows the existence of certain connections, particularly connections $C_1$–$C_5$. The location of the block containing the connection number $C_x$ in FIG. 4A denotes the geographical position of the user equipment unit (UE) involved in the connection. For example, at the time shown in FIG. 4A, the user equipment unit (UE) involved in connection $C_1$ is in a cell which is controlled by $RNC_1$. Moreover, as specified by the notation SRNC: $RNC_1$ in the block of connection $C_1$, radio network controller $RNC_1$ is the serving RNC for connection $C_1$ (and thus is in control of the connection insofar as the radio access network is concerned). Since the user equipment unit (UE) for connection $C_1$ is in a cell of a base station controlled by radio network controller $RNC_1$ and the SRNC for connection $C_1$ is radio network controller $RNC_1$, the number of hops utilized by connection $C_1$ is zero. The block for connection $C_1$ in FIG. 4A also indicates that the bandwidth required for connection $C_1$ is 6 Mbit.

Four other connections are also illustrated in FIG. 4A, each being depicted by a separate block. Two connections (connection $C_2$ and connection $C_3$) are shown as in FIG. 4A having their user equipment units (UEs) in a cell whose base station is controlled by radio network controller $RNC_2$. Of these, connection $C_2$ has radio network controller $RNC_1$ as its SRNC, and thus for connection $C_2$ there is one hop (i.e., one link $Iur_1$) between radio network controller $RNC_2$ (which serves as the DRNC) and radio network controller $RNC_1$ (which is the SRNC). Connection $C_3$, on the other hand, has radio network controller $RNC_2$ as its SRNC, and accordingly there are no hops. Both connection $C_2$ and connection $C_3$ are 5 Mbit connections.

Two other connections (connection $C_4$ and connection $C_5$) are shown as in FIG. 4A having their user equipment units (UEs) in a cell whose base station is controlled by radio network controller $RNC_3$. Of these, connection $C_4$ has radio network controller $RNC_1$ as its SRNC, and thus for connection $C_4$ there are two hops (i.e., link $Iur_1$ and link Iur2) between radio network controller $RNC_3$ (which serves as the DRNC) and radio network controller $RNC_1$ (which is the SRNC). Connection $C_5$, on the other hand, has radio network controller $RNC_3$ as its SRNC, and accordingly there are no hops. Both connection $C_4$ and connection $C_5$ are 5 Mbit connections.

In the illustrated example of FIG. 4A–FIG. 4E, each of the Iur links has a total bandwidth limit of 10 Mbit/s. In the FIG. 4A scenario, the current load for link $Iur_1$ is 10 Mbit; the current load for link $Iur_2$ is 5 Mbit; the current load for link $Iur_3$ is 0 Mbit. Thus, in the scenario shown in FIG. 4A, no Iur link is overloaded.

FIG. 4B shows a scenario which can occur subsequently to FIG. 4A—the user equipment unit (UE) involved in connection $C_2$ moves to a cell whose base station is controlled by radio network controller $RNC_3$. After the user equipment unit (UE) involved in connection $C_2$ moves into the jurisdiction of radio network controller $RNC_3$, there are two hops for connection $C_2$. Fortunately, for the scenario of FIG. 4B, no Iur link is yet overloaded. For example, the load on link $Iur_2$ is now 10 Mbit, since in FIG. 4B link $Iur_2$ carries both connection $C_2$ and connection $C_4$. Thus, the 10 Mbit capacity of link $Iur_2$ is not yet exceeded.

Figure 4C:
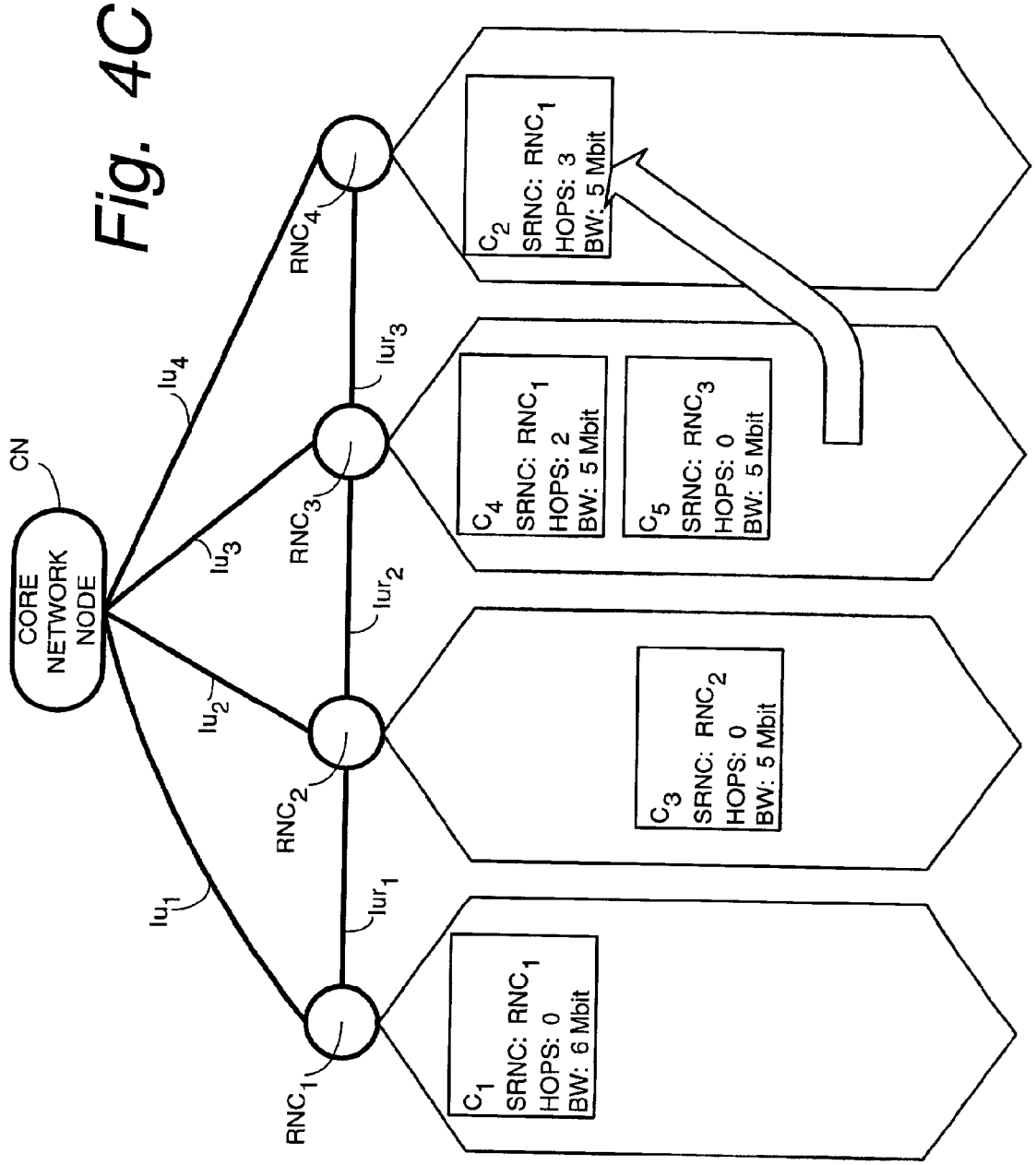

FIG. 4C shows a subsequent scenario in which the user equipment unit (UE) involved in connection $C_2$ moves even further, i.e., into a cell whose base station is controlled by radio network controller $RNC_4$. After the user equipment unit (UE) involved in connection $C_2$ moves into the jurisdiction of radio network controller $RNC_4$, there are three hops for connection $C_2$. The load on link $Iur_2$ is thus unchanged; the load on link $Iur_3$ increases from zero to 5 Mbit. However, none of the links Iur in FIG. 4C are overloaded (i.e., none carry greater than 10 Mbit).

Figure 4D:
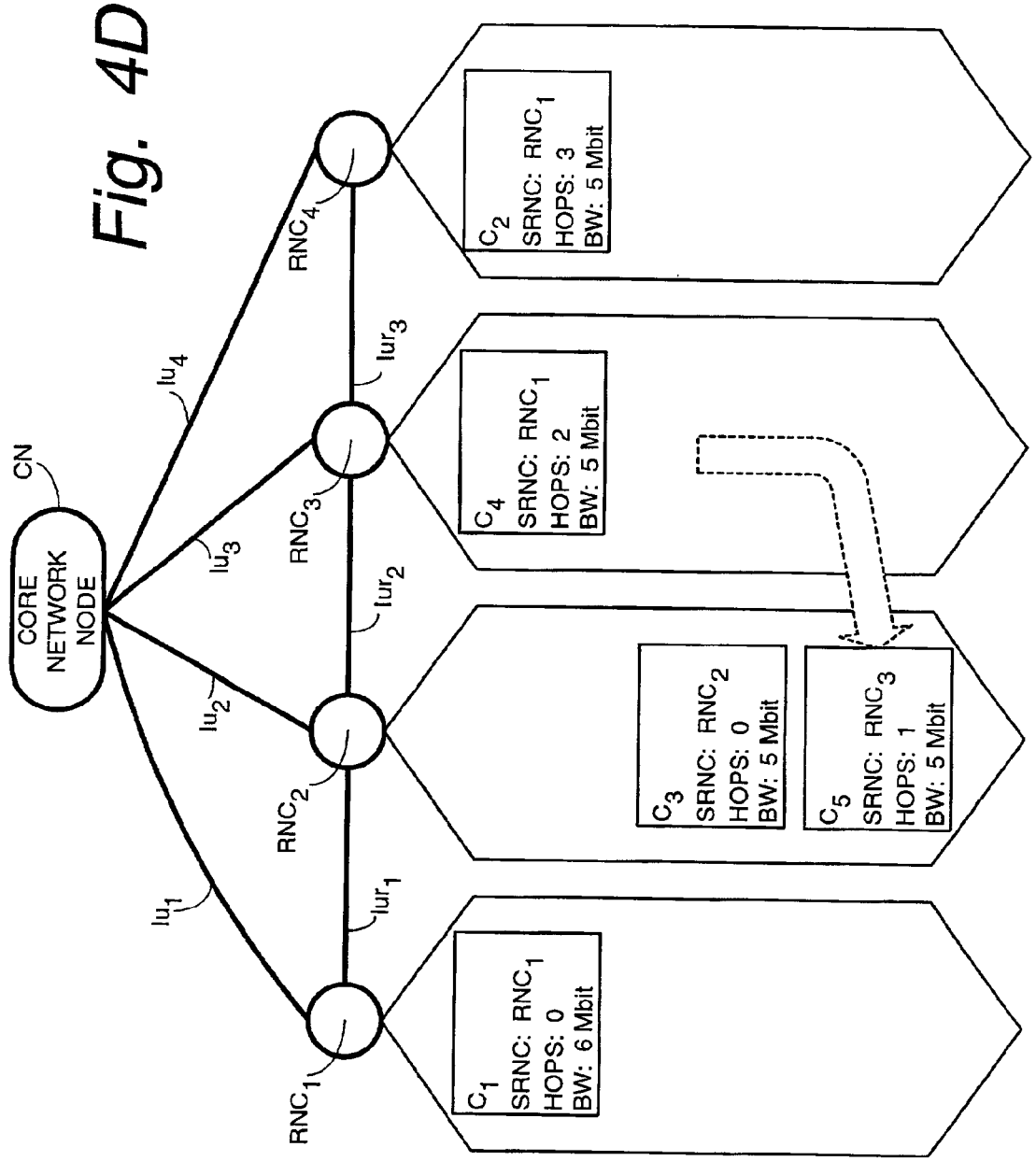

FIG. 4D shows a subsequent scenario in which the user equipment unit (UE) involved in connection $C_5$ also moves into a cell whose base station is controlled by radio network controller $RNC_2$. In the scenario of FIG. 4D, the link $Iur_2$ would become overloaded if it were to carry both connection $C_4$, connection $C_2$, and connection $C_5$. In the scenario of FIG. 4D, the total load on link $Iur_1$ is 10 Mbit; the total load on link $Iur_2$ would be 15 Mbit; and the total load on link $Iur_3$ is 5 Mbit.

The basic steps involved in the first mode of the invention are shown in FIG. 3A.

The connection control process 202 monitors, at step 202-1 thereof, the connections which it supervises. A request for establishment of a new connection (e.g., initiating a first leg of a connection or a new leg of an existing connection) is detected at step 202-2. Each cell change for a user equipment unit (UE) in the foregoing scenarios of FIG. 4A–FIG. 4D, for example, was detected at step 202-2. When there is a request for a new connection or new leg of an existing connection, at step 202-3 the connection control process 202 determines whether the new connection (or new leg of an existing connection) would result in an overload on any inter-control node link, e.g., Iur link. If the requested new connection does not result in an over load of any inter-control node link, then (at step 202-4) the connection control process 202 adds the connection, there being no need to have an inter-RNC moveover.

For all UE moves in the foregoing scenarios except the move of the user equipment unit (UE) involved in connection $C_5$, the connection control process 202 determined at step 202-3 that there was no Iur link overload. However, when the user equipment unit (UE) involved in connection $C_5$ moves into the jurisdiction of radio network controller $RNC_2$, at step 202-3 of connection control process 202 it is surmised that the addition of a leg for connection $C_5$ would result in the aforedescribed overload on inter-control node link $Iur_2$. In the first mode of the invention, such determination of potential overload invokes the handover selection communication function 206.

The handover selection communication function 206 prepares and sends the handover selection request message 210 (see also FIG. 2A) to the handover selection function 200A of the core network node CNN. The handover selection request message 210 includes the information that handover selection function 200A requires for its basic execution, including an identity of the potentially overloaded link and the topology of the subnetwork of the radio control node which issues the handover selection request message 210. Further for each connection the handover selection function 200A executing at the core network control node (CN) needs to know the data path to the target RNC (e.g., the data path from the MSC to the SRNC, from the SRNC to a first DRNC, from the first DRNC to the next DRNC, etc.). In addition, the handover selection function 200B needs to know the required bandwidth and connection quality requirements (quality class, etc.). The handover selection function 200A performs basic steps (also shown in FIG. 3A), and upon completion of its execution returns its directives regarding the handover in the handover selection response message 212.

An early step performed by handover selection function 200A is obtaining the network topology-related information necessary for performing the handover selection function 200A. This network topology-related information includes not only the topology of the network, but also such information items as the bandwidth limit on each Iur link, what connections are being carried on each Iur link, and the bandwidth of each such connection. This network topology-related information is readily known to the core network control node (CN).

In the performance of its execution, handover selection function 200A determines at step 200-1 the cost of each connection over the inter-control node link (Iur link) which is overloaded. As employed herein, "overloaded" means that a link suffers from overload, or faces a potential of overload if a connection or leg of a connection were to be added. The cost for each of the connections carried on the overloaded link is a product of a number of inter-control links involved in the connection and an inter-control link bandwidth required by the connection. The cost for connection $C_x$ over overloaded link $Iur_y$ is as shown in Expression 1.

Cost $C_x$=(number of hops)×($Iur_y$ bandwidth for $C_x$)  Expression 1

In the situation contemplated in FIG. 4D, there are three connections $C_2$, $C_4$, and $C_5$ which are carried by the overload link $Iur_2$. The cost for each of connection $C_2$, $C_4$, and $C_5$ as determined at step 202-1 are as follows:

Cost $C_2$=5×3=15 Mbit

Cost $C_4$=5×2=10 Mbit

Cost $C_5$=5×1=5 Mbit

At step 200A-2 the handover selection function 200 determines which of the connections utilizing the overloaded inter-node link is the most expensive (e.g., most costly) connection. From the foregoing cost calculations, connection $C_2$ is clearly the most expensive connection in the FIG. 4D scenario. Therefore, in accordance with step 200A-2, connection $C_2$ becomes the candidate connection to have an inter-RNC handover.

Step 200A-3 involves the handover selection function 200A determining a target SRNC for the most expensive connection, i.e., the candidate connection determined at step 200A-2. That is, at step 200A-3 the handover selection function 200A determines to which of the DRNCs involved in the candidate connection the SRNC role should be moved. In accordance with an aspect of the present invention, the target control node (e.g., target SRNC) chosen by the handover selection function 200A is a control node involved in the candidate connection which is farthest from the control node which has been functioning as the serving control node for the connection (e.g., functioning as the SRNC). In the situation shown in FIG. 4D, therefore, the target SRNC for connection $C_2$ is the RNC involved in connection $C_2$ which is farthest from radio network controller $RNC_1$, i.e., radio network controller $RNC_4$.

After the determination of target SRNC is made at step 200A-3, at step 200A-4 the handover selection function 200A ascertains whether the target SRNC can, in fact, become the new SRNC for connection $C_2$. One factor taken into consideration at step 200A-4 is whether the Iu link to the target SRNC (e.g., the link $Iu_4$ to radio network controller $RNC_4$ in the FIG. 4D scenario) will be overloaded.

If it is determined at step 200A-4 that the target SRNC can qualify as the new SRNC for the most expensive connection, the handover selection function 200A terminates and step 200A-6 is executed. At step 200A-6, the handover selection function 200A prepares and sends the handover selection response message 212 to the handover selection communication function 206 at the radio network control node (see FIG. 3A and FIG. 2A). Upon receipt of the handover selection response message 212, the handover selection communication function 206 initiates performance of the inter-control node handover process 204, also known as the moveover process. Techniques involved in a handover or moveover of a serving RNC are understood by those skilled in the art as well as described at least in part in one or more of the following: U.S. patent application Ser. No. 09/979,866 filed Nov. 26, 1997, entitled "Multistage Diversity Handling For CDMA Telecommunications"; U.S. patent application Ser. No. 09/980,013 filed Nov. 26, 1997, entitled "Diversity Handling Moveover For CDMA Telecommunications"; U.S. patent application Ser. No. 09/035,788 filed Mar. 6, 1998, entitled "Telecommunications Inter-Exchange Congestion Control"; and U.S. patent application Ser. No. 09/035,821 filed Mar. 6, 1998, entitled "Telecommunications Inter-Exchange Measurement Transfer", all of which are incorporated herein by reference in their entirety.

Figure 4E:
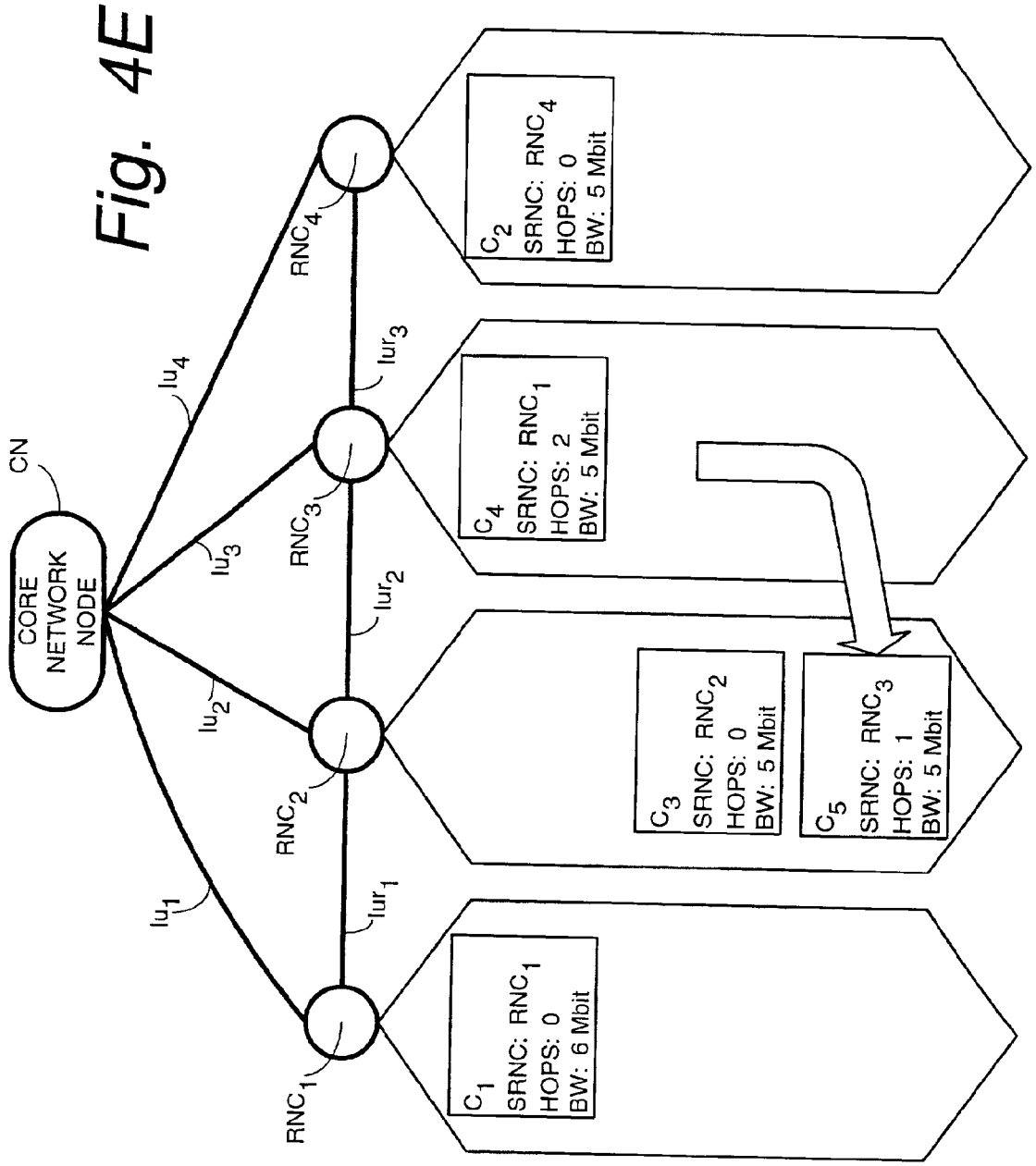

After the inter-RNC handover process 204 is performed, the scenario of FIG. 4E results. It is to be noted in FIG. 4E that the connection $C_2$ has radio network controller $RNC_4$ as its SRNC, all in accordance with the selection performed by handover selection function 200A as above described. Moreover, as a result of the inter-RNC handover, the load on link $Iur_1$ is 5 Mbit; the load on link $Iur_2$ is 10 Mbit; and the load on link $Iur_3$ is 0 Mbit. Further, FIG. 4E reflects the fact that, in view of the inter-RNC handover implemented by inter-RNC handover process 204, the set up of connection $C_2$ at radio network controller $RNC_2$ is accommodated (see step 202-4 of the connection control process 202 in FIG. 3).

If it is determined at step 200A-4 that the target SRNC for the candidate connection cannot serve as the SRNC therefor, the handover selection function 200A performs step 200A-5. At step 200A-5, the handover selection function 200A decreases a number of the inter-control node links which can be utilized by the new connection or new leg of the connection before reattempting its selection of a candidate connection. In other words, the handover selection function 200A decreases the number of hops for the refused new connection, e.g., temporarily keeps connection $C_5$ at radio network controller $RNC_3$. Then handover selection function 200A repeats the steps 200A-1 through 200A-4, considering connection $C_5$ still to be at radio network controller radio network controller $RNC_3$. At step 200A-1, the handover selection function 200A calculates adjusted costs for the connections carried on the overloaded Iur link. The cost calculations for connection $C_2$ and connection $C_4$ are the same as previously determined, the cost for connection $C_5$ is now 0 Mbit (since it remains at radio network controller $RNC_3$). So at step 200A-2 connection $C_2$ is again determined to be the most expensive connection. At step 200A-3 the handover selection function 200A determines the target SNRC for the most expensive connection. Since the previous target SNRC (radio network controller $RNC_4$) did not qualify, at step 200A-3 the handover selection function 200A chooses the next farthest RNC from the current SRNC, e.g., radio network controller $RNC_3$, as the target SRNC. Assuming that the radio network controller $RNC_3$ qualifies as the target SRNC (e.g., there is no problem on the link $Iu_3$), step 200A-6 is performed for preparing and sending the handover selection response message 212 to handover selection communication process 206. The handover process 204 is then invoked to implement the inter-RNC handover, after which the set of for connection $C_5$ at radio network controller $RNC_2$ can occur (step 202-4).

Figure 5A:
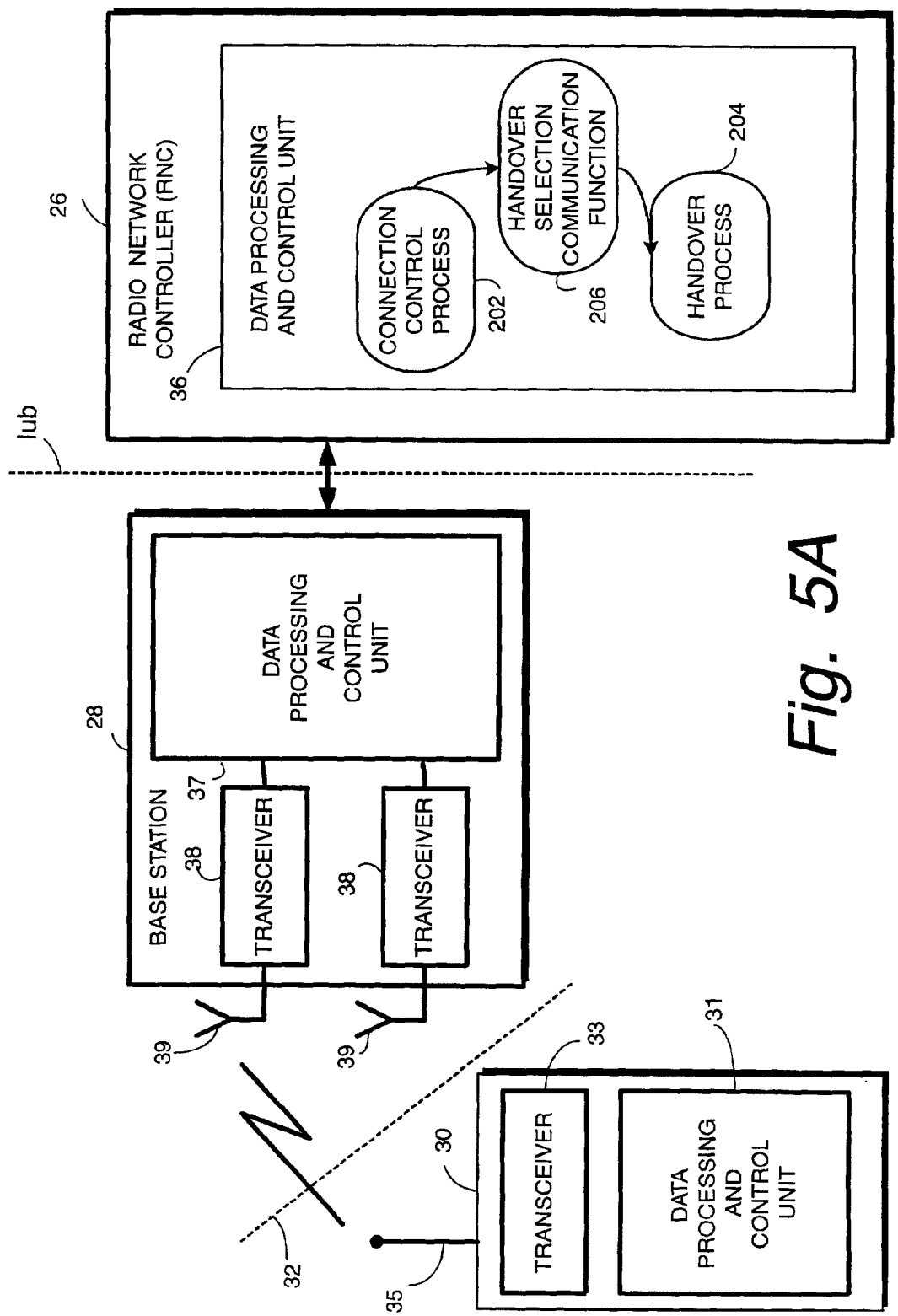
FIG. 5A is a simplified function block diagram of a portion of a UMTS Terrestrial Radio Access Network, including a user equipment unit (UE) station; a radio network controller; and a base station, suitable for the first mode of the invention.
Figure 5B:
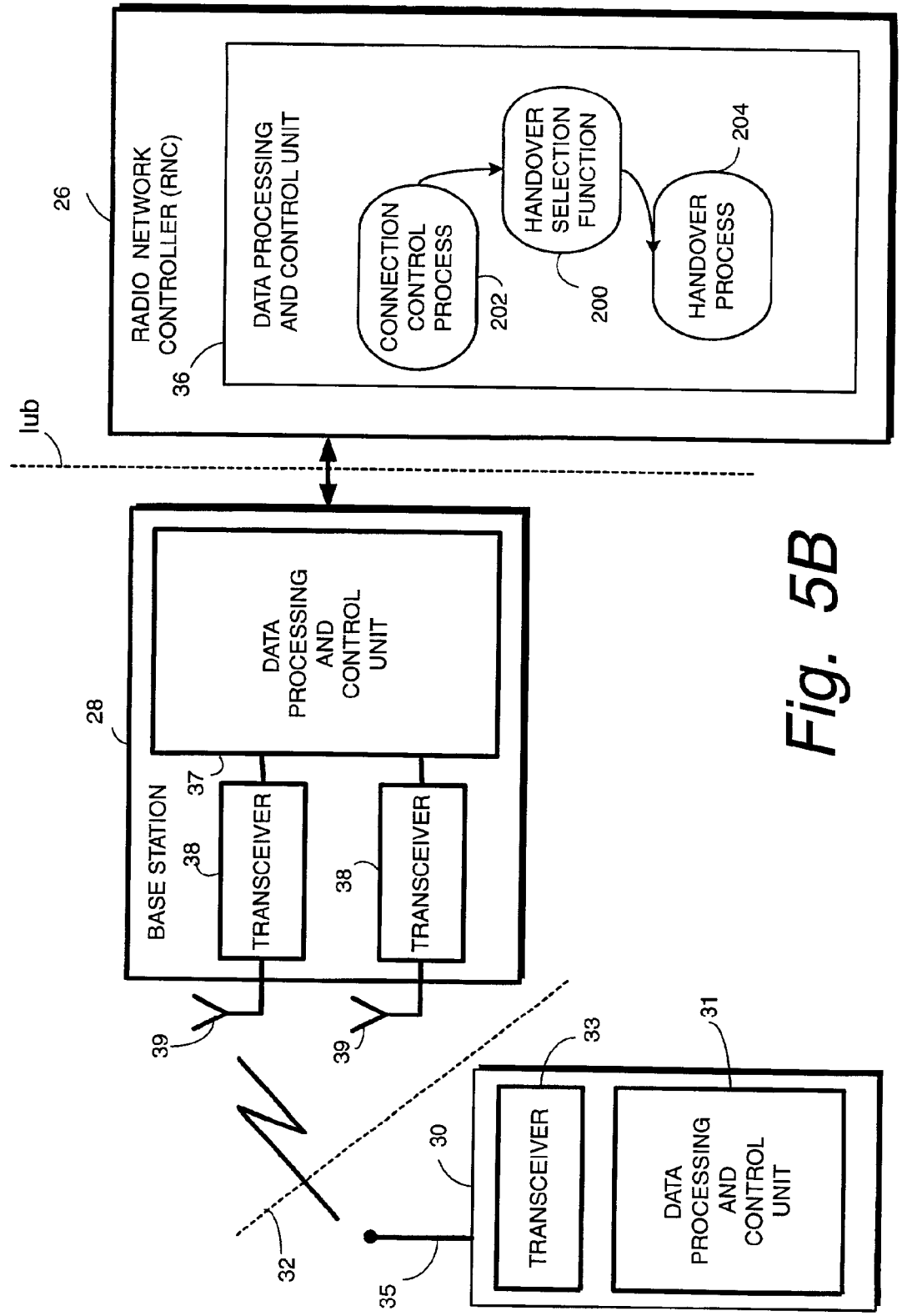
FIG. 5B is a simplified function block diagram of a portion of a UMTS Terrestrial Radio Access Network, including a user equipment unit (UE) station; a radio network controller; and a base station, suitable for the second mode of the invention.

The second mode of the invention is represented diagrammatically by FIG. 3B and FIG. 5B, which correspond to FIG. 3A and FIG. 5A of the first mode. The performance of the second mode resembles the first mode in large degree. In view of the similarities of these modes, only the differences of the two modes are discussed below.

The connection control process 202 of the second mode is essentially the same as the first mode, but upon a determination at step 202-3 of potential overload, instead directly invokes the handover selection function 200B. The handover selection function 200B resides at the same node as the connection control process 202, e.g., at a radio access network control node. The handover selection function 200B of the second mode performs the step 200B-0 through 200B-4, and optionally step 200B-5, as shown in FIG. 3B. Except for step 200B-0, the steps of handover selection function 200B are essentially the same as the steps of handover selection function 200A of the first mode. 20 However, upon a positive determination at step 200B-4 that the target RNC for the most expensive connection can become the SRNC, the handover selection function 200B directly invokes the handover process 204 (which is also resident at the same node [e.g., the same radio access network control node]).

Step 200B-0 of the second mode, mentioned above as being unique to the second mode, involves handover selection function 200B sending the network topology request message 220 (see FIG. 2B) to topology maintenance function 208. The network topology request message 220 request that the topology maintenance function 208 (located at the core network control node (CN)) provide the handover selection function 200B with the network topology-related information necessary for performance of the handover selection function 200B. Such requested information includes not only the topology of the network, but also such information items as the bandwidth limit on each Iur link, what connections are being carried on each Iur link, and the bandwidth of each such connection. The requested information is returned to the handover selection function 200B in the network topology request message 222 (see FIG. 2B).

A distributed information exchange protocol such as a routing information protocol is used in the second mode for messages such as the network topology request message 220 and the network topology request message 222. Such routing information protocols are analogous to the Routing Information Protocol (RIP) and the Open Shortest Path First Protocol (OSPF), which are described by IETF RFC2453 and IETF RFC2328, although RIP and OSPF per se are not usable for the present invention.

A variation of the second mode of the invention is to have the handover selection function 200B at step 200B-0 obtain the topology information from the radio access network, e.g., from the very radio network control node which hosts the handover selection function. In such case, however, provision must be made for updating the radio access network control node with the network topology-related information.

Currently the first mode of the invention is deemed preferable to the second mode, as the second mode having the handover selection function 200B in the radio network control (RNC) node of the radio access network is more complex and introduces delays due to the information exchange protocol, and the nature of the distributed functionality is potentially subject to erroneous decisions.

Figure 6A:
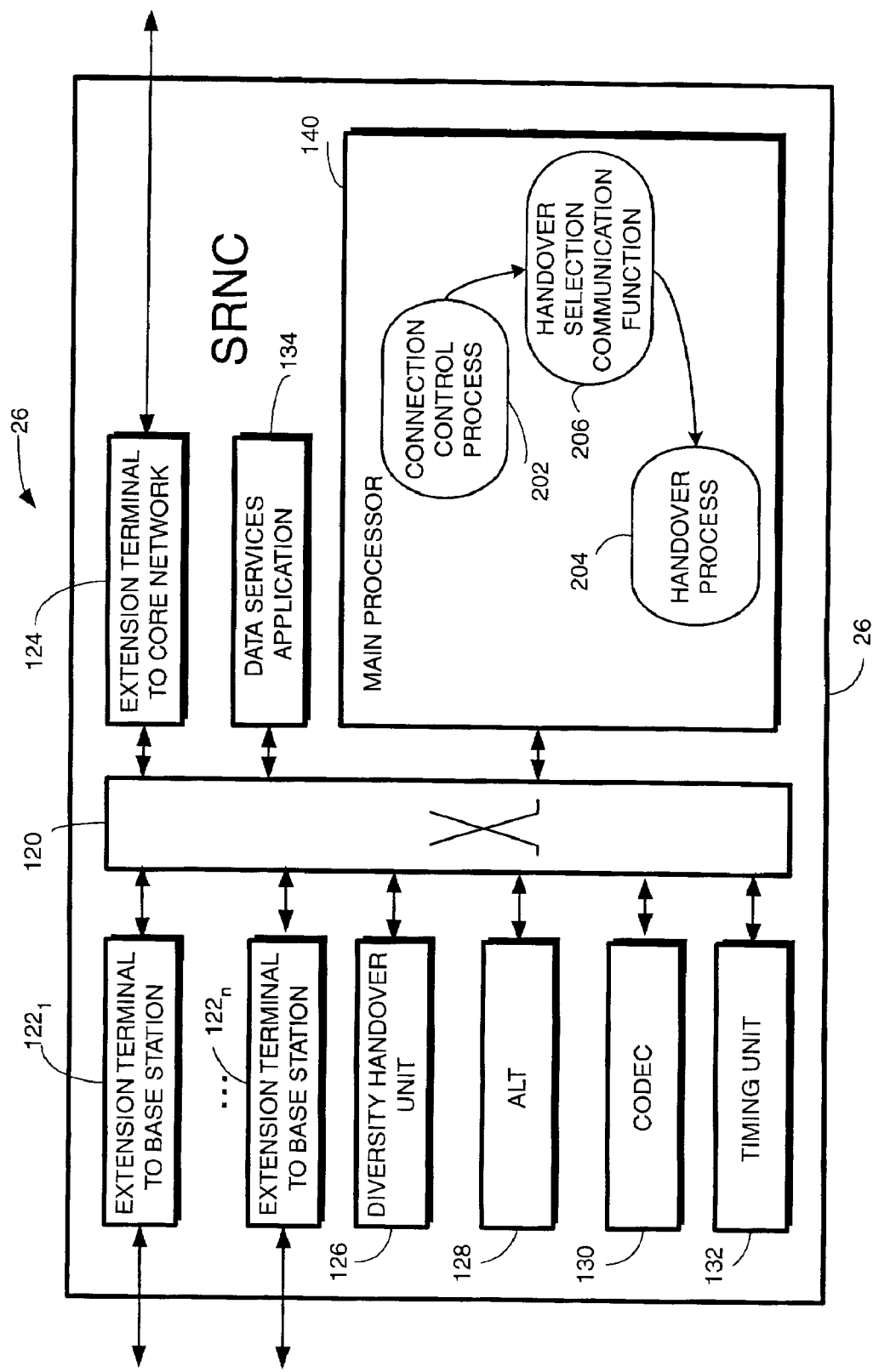
FIG. 6A is a schematic view of an example RNC node configured for the first mode of the invention.

Structural deployment of the first mode of the invention in a radio access network is shown in FIG. 5A and FIG. 6A. FIG. 5A shows selected general aspects of user equipment unit (UE) 30 and illustrative nodes such as radio network controller 26 and base station 28. The user equipment unit (UE) 30 shown in FIG. 5A includes a data processing and control unit 31 for controlling various operations required by the user equipment unit (UE). The UE's data processing and control unit 31 provides control signals as well as data to a radio transceiver 33 connected to an antenna 35.

The example radio network controller 26 and base station 28 as shown in FIG. 5A are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

FIG. 6A illustrates, in somewhat more detail, an example non-limiting RNC node 26 of the present invention. It so happens that the RNC node 26 of FIG. 6A is a switched-based node having a switch 120. The switch 120 serves to interconnect other constituent elements of RNC node 26. Such other constituent elements include extension terminals 122$_1$ through 122$_n$, as well as extension terminal 124. Extension terminals 122$_1$ through 122$_n$ essentially function to connect RNC node 26 to the base stations 28 served by RNC node 26; extension terminal 124 connects RNC node 26 across the Iu interface to the core network.

Yet other constituent elements of RNC node 26 include diversity handover unit 126; an ALT unit 128; codex 130; timing unit 132; a data services application unit 134; and, a main processor 140. The person skilled in the art will appreciate generally the functions of these constituent elements, it being noted that the ALT unit 128 is a unit which provides, e.g., multiplexing and demultiplexing and (optionally) queuing with regard to differing protocols of cells.

FIG. 5A illustrates the connection control process 202, handover process 204, and handover selection communication process 206 executing on a data processing and control unit 36 of RNC 26. FIG. 6 shows more particularly the connection control process 202, handover process 204, and handover selection communication process 206 executing on main processor 140 of RNC 26.

The second mode of the invention (generally shown in FIG. 2B and FIG. 3B) has structural implementations illustrated in FIG. 5B and FIG. 6B. FIG. 5B and FIG. 6B basically resemble FIG. 5A and FIG. 6A, but instead show that handover selection function 200B is performed at the RNC 26. In particular, FIG. 5B illustrates the connection control process 202, handover process 204, and handover selection process 200B as executing on the data processing and control unit 36 of RNC 26. FIG. 6 shows more particularly the connection control process 202, handover process 204, and handover selection process 200B executing on main processor 140 of RNC 26.

The present invention with its handover selection function provides an elegant way of finding the correct handover configuration in a potential Iur link overload situation. The present invention forms a basis for an inter-control node handover strategy that uses as few handovers as possible while utilizing the network links in an efficient manner.

The handover selection function of the present invention can be stand alone, which means that it an be used in conjunction with other stand alone network optimization algorithms or techniques. For example, the handover selection function 200 of the present invention can be utilized in conjunction with the techniques of simultaneously-filed U.S. patent application Ser. No. 09/732,883, entitled "Balancing Loads on Telecommunications Links", which is incorporated herein by reference in its entirety. The handover selection function 200 of the present invention works well alone, but can be even more efficient or synergistic with other algorithms. The same algorithm can be used on both bidirectional and unidirectional links. As mentioned above, the handover selection function 200 can be implemented in either a radio network controller (RNC) node, or some other non-base station network node.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A telecommunications system having a radio access network comprising:

plural control nodes;

inter-control node links for connecting the plural control nodes;

a handover selection unit which makes a selection regarding which of plural connections handled by the radio access network should have control thereof moved from a first control node to another of the plural control nodes to alleviate congestion on an overloaded one of the inter-control node links, the selection including a determination of a cost for each of the connections carried by the overloaded link;

wherein the cost for each of the connections carried by the overloaded link depends on (1) a number of inter-control links involved in the connection, and (2) an inter-control link bandwidth required by the connection.

2. The system of claim 1, wherein the cost for each of the connections carried by the overloaded link is a product of a number of inter-control links involved in the connection and an inter-control link bandwidth required by the connection.

3. The system of claim 1, wherein the handover selection unit is situated at one of the plural control nodes.

4. The system of claim 1, wherein the handover selection unit is situated at core network node.

5. The system of claim 1, wherein the handover selection unit makes the selection when an attempt is made to add a new connection or new leg of a connection to the radio access network, and wherein when hand over of control of the candidate connection to the target control node is unacceptable to the network, the handover selection unit decreases a number of the inter-control node links which can be utilized by the new connection or new leg of the connection before reattempting its selection.

6. A telecommunications system having a radio access network comprising:

plural control nodes;

inter-control node links for connecting the plural control nodes;

a handover selection unit which makes a selection regarding which of plural connections handled by the radio access network should have control thereof moved from a first control node to another of the plural control nodes to alleviate congestion on an overloaded one the inter-control node links, the selection including a determination of a cost for each of the connections carried by the overloaded link;

wherein the selection includes a determination of a most costly one of the connections carried by the overloaded link, and wherein the most costly one of the connections carried by the overloaded link becomes a candidate connection for handover.

7. The system of claim 6, wherein the handover selection unit further determines a target one of the plural control nodes to which the control of the candidate connection can be handed over, the target control node being a control node involved in the candidate connection which is farthest from the first control node.

8. A method of operating telecommunications system having a radio access network, the radio access network having plural control nodes and inter-control node links for connecting the plural control nodes, wherein the method comprises:

selecting which of plural connections handled by the radio access network should have control thereof moved from a first control node to another of the plural control nodes to alleviate congestion on an overloaded one of the inter-control node links, the selecting including a determining a cost for each of the connections carried by the overloaded link;

determining the cost for each of the connections carried by the overloaded link as a function of (1) a number of inter-control links involved in the connection, and (2) an inter-control link bandwidth required by the connection.

9. The method of claim 8, further comprising determining the cost for each of the connections carried by the overloaded link by multiplying a number of inter-control links involved in the connection and an inter-control link bandwidth required by the connection.

10. The method of claim 8, wherein the selecting step is performed when an attempt is made to add a new connection or new leg of a connection to the radio access network, and wherein when hand over of control of the candidate connection to the target control node is unacceptable to the network, a number of the inter-control node links which can be utilized by the new connection or new leg of the connection is decreased before reattempting the selecting step.

11. A method of operating telecommunications system having a radio access network, the radio access network having plural control nodes and inter-control node links for connecting the plural control nodes, wherein the method comprises:

selecting which of plural connections handled by the radio access network should have control thereof moved from a first control node to another of the plural control nodes to alleviate congestion on an overloaded one of the inter-control node links, the selecting including a determining a cost for each of the connections carried by the overloaded link;

wherein the selecting includes determining a most costly one of the connections carried by the overloaded link, and wherein the most costly one of the connections carried by the overloaded link becomes a candidate connection for handover.

12. The method of claim 11, further comprising determining a target one of the plural control nodes to which the control of the candidate connection can be handed over, the target control node being a control node involved in the candidate connection which is farthest from the first control node.

13. A handover selection function which makes a selection regarding which of plural connections handled by the radio access network should have control thereof moved from a first control node to another of plural control nodes of a radio access network to alleviate congestion on an overloaded one of inter-control node links connecting the plural control nodes, the selection including making a determination of a cost for each of the connections carried by the overloaded link; wherein the cost for each of the connections carried by the overloaded link depends on (1) a number of inter-control links involved in the connection, and (2) an inter-control link bandwidth required by the connection.

14. The function of claim 13, wherein the function is performed at one of the plural control nodes of the radio access network.

15. The function of claim 13, wherein the function is performed at a core network node.

16. The function of claim 13, wherein the cost for each of the connections carried by the overloaded link is a product of a number of inter-control links involved in the connection and an inter-control link bandwidth required by the connection.

17. The function of claim 13, wherein the handover selection function makes the selection when an attempt is made to add a new connection or new leg of a connection to the radio access network, and wherein when hand over of control of the candidate connection to the target control node is unacceptable to the network, the handover selection function decreases a number of the inter-control node links which can be utilized by the now connection or new leg of the connection before reattempting its selection.

18. A handover selection function which makes a selection regarding which of plural connections handled by the radio access network should have control thereof moved from a first control node to another of plural control nodes of a radio access network to alleviate congestion on an overloaded one of inter-control node links connecting the plural control nodes, the selection including making a determination of a cost for each of the connections carried by the overloaded link, wherein the selection includes a determination of a most costly one of the connections carried by the overloaded link, and wherein the most costly one of the connections carried by the overloaded link becomes a candidate connection for handover.

19. The function of claim 18, wherein the handover selection function further determines a target one of the plural control nodes to which the control of the candidate connection can be handed over, the target control node being a control node involved in the candidate connection which is farthest from the first control node.

* * * * *